(12) United States Patent
Schuetz

(10) Patent No.: US 11,234,795 B2
(45) Date of Patent: Feb. 1, 2022

(54) ORTHODONTIC REGULATION DEVICE

(71) Applicant: Winfried Schuetz, Munich (DE)

(72) Inventor: Winfried Schuetz, Munich (DE)

( * ) Notice: Subject to any disclaimer, the term of this patent is extended or adjusted under 35 U.S.C. 154(b) by 0 days.

(21) Appl. No.: 16/225,171

(22) Filed: Dec. 19, 2018

(65) Prior Publication Data
US 2019/0192260 A1   Jun. 27, 2019

(30) Foreign Application Priority Data

Dec. 22, 2017   (DE) ..................... 10 2017 012 032.3

(51) Int. Cl.
*A61C 7/02*      (2006.01)
*A61C 7/22*      (2006.01)
*A61C 8/00*      (2006.01)
*A61C 7/00*      (2006.01)

(52) U.S. Cl.
CPC .................. *A61C 7/02* (2013.01); *A61C 7/00* (2013.01); *A61C 7/22* (2013.01); *A61C 8/0096* (2013.01)

(58) Field of Classification Search
CPC .... A61C 7/02; A61C 7/00; A61C 7/22; A61C 8/0096
USPC ........................................................... 433/18
See application file for complete search history.

(56) References Cited

U.S. PATENT DOCUMENTS

| | | | | |
|---|---|---|---|---|
| 4,483,674 A | * | 11/1984 | Schutz ..................... | A61C 7/00 433/11 |
| 5,022,855 A | * | 6/1991 | Jeckel ..................... | A61C 7/00 433/18 |
| 6,089,862 A | * | 7/2000 | Schutz ..................... | A61C 7/22 433/18 |
| 6,193,509 B1 | * | 2/2001 | DeVincenzo ............ | A61C 7/00 433/173 |
| 6,435,870 B1 | * | 8/2002 | Walde ...................... | A61C 7/00 433/18 |
| 7,771,196 B2 | * | 8/2010 | Weissbach Otte ....... | A61C 7/10 433/7 |
| 8,257,078 B2 | * | 9/2012 | Winsauer ................. | A61C 7/00 433/7 |
| 2004/0110108 A1 | * | 6/2004 | Weissbach Otte ....... | A61C 7/00 433/18 |
| 2006/0024636 A1 | * | 2/2006 | Bowman .................. | A61C 7/10 433/18 |
| 2008/0020339 A1 | * | 1/2008 | Papadopoulos .......... | A61C 7/10 433/21 |
| 2009/0176190 A1 | * | 7/2009 | Ruiz-Vela ................ | A61C 7/10 433/174 |
| 2009/0186314 A1 | * | 7/2009 | Pober ....................... | A61C 7/10 433/18 |

(Continued)

*Primary Examiner* — Matthew M Nelson
(74) *Attorney, Agent, or Firm* — Robert W. Morris; Eckert Seamans Cherin & Mellott, LLC

(57) ABSTRACT

An orthodontic device for displacing a tooth and/or a group of teeth of a patient, which directly adjoin the tooth along a mandibular arch, in particular in the lower jaw in the area of the molars, the device comprising: a rigid, dimensionally stable connection between the tooth to be displaced and an attachment point for the device which fixed to the jaw and substantially does not change during the treatment of the patient, a regulating device for changing the length of the rigid connection in direct vicinity of the tooth to be displaced. A torsion-proof attachment of the device in the jaw bone may be provided. Alternatively, a point of support is provided on one tooth.

11 Claims, 3 Drawing Sheets

(56) References Cited

U.S. PATENT DOCUMENTS

Figure 1:
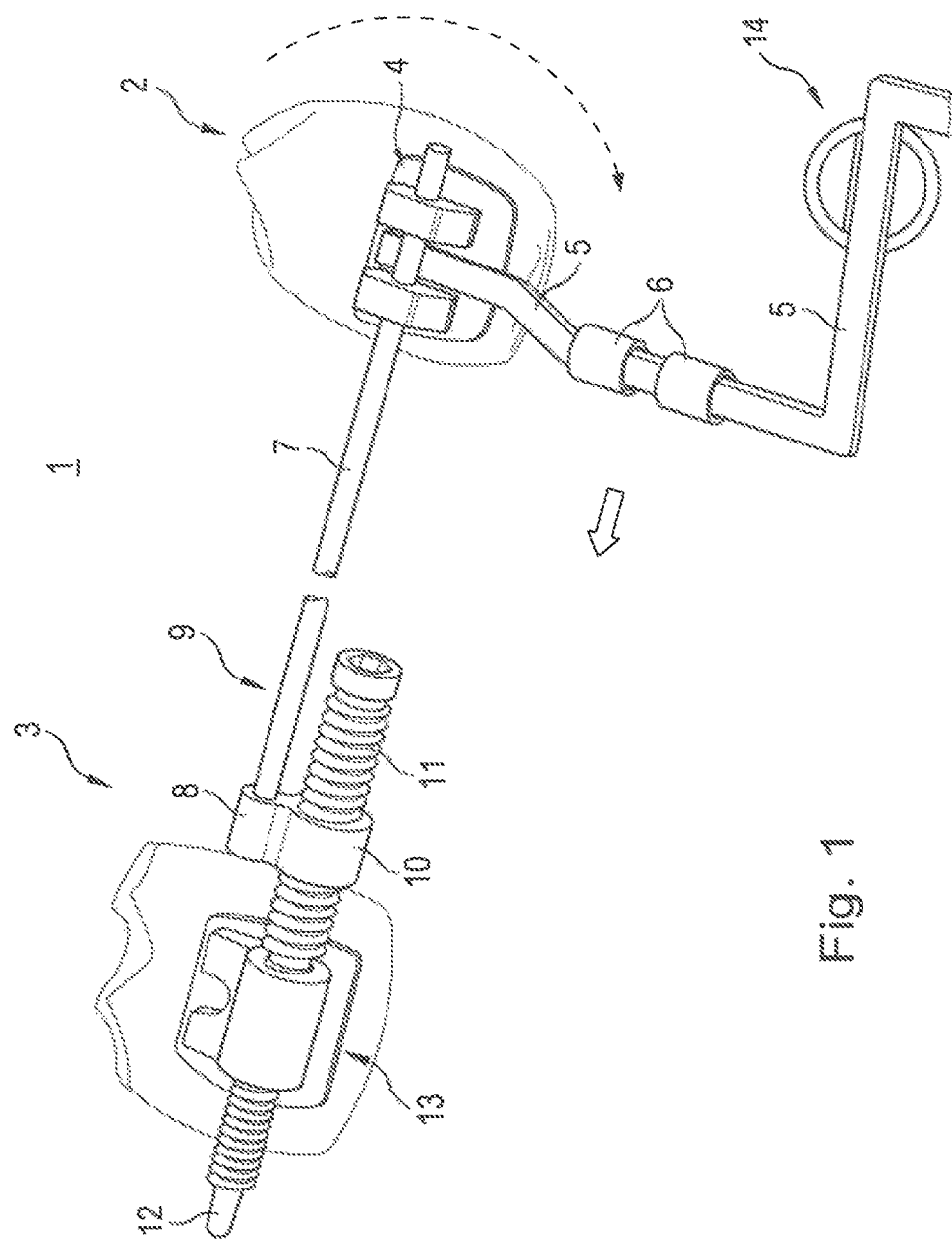

| | | | |
|---|---|---|---|
| 2010/0092903 A1* | 4/2010 | Sabilla | A61C 7/00 433/2 |
| 2010/0129766 A1* | 5/2010 | Hilgers | A61C 7/00 433/20 |
| 2010/0178628 A1* | 7/2010 | Kim | A61C 7/145 433/10 |
| 2012/0003600 A1* | 1/2012 | Winsauer | A61C 7/00 433/7 |
| 2013/0149659 A1* | 6/2013 | Garnett | A61C 7/22 433/20 |

* cited by examiner

ORTHODONTIC REGULATION DEVICE

This application claims priority from German Application No. DE 10 2017 012 032.3, filed on Dec. 22, 2017, the disclosure of which is incorporated by reference herein in its entirety.

The invention relates to an orthodontic regulatory device for displacing a tooth or one group of teeth bordering on it along the mandibular arch of a patient in the sagittal direction towards the mesial or distal direction. The terms tooth or group of teeth will be used in the following as having the same meaning.

The device is to be preferably inserted into the lower jaw in the area between the first premolar tooth and the molars.

An important object of orthodontics consists in regulating the space conditions in the mandibular arch for the teeth and to adjust them in such a way that the teeth are side by side in an anatomically correct relationship. Teeth in the molar region, i.e. the molars, are often the cause of such regulatory measures.

It must often be differentiated between lack of space and excess of space within the mandibular arch in the case of such a regulation.

In the case of a lack of space it will be necessary to first of all create the space required by the teeth in the correct position. For this purpose, a tooth in the area of the molars must often be displaced. The alternative to this would be the orthodontically indicated tooth extraction.

If there is an excess of space in the jaw for whatever reason, the corresponding teeth must be moved towards each other if it a diastema is intended. This is often connected with a mesialization of the molars.

Examples of such orthodontic corrections are described in U.S. Pat. Nos. 4,483,674 and 6,089,862.

In the regulatory device according to the last mentioned US patent a stable base wire extends along the mandibular arch and is held in clamps, so-called brackets, the brackets being attached to individual teeth. The force required for displacing the tooth or the group of teeth is precisely generated by a locking or straining screw. It is not so advantageous to apply the actuating power by means of springs, since the spring resistance cannot be adjusted in such a precise way as is the case with a screw and thus often "works" in the non-physiological range.

In conventional regulatory devices distraction or expansion screws are also used for displacing teeth along the mandibular arch. These are often removable devices which have the decisive disadvantage that no physical movement takes place with them.

The stable base wire or the locking screw is attached to a reference tooth in the majority of the known fixed regulatory devices, which is to move or to be moved only to a very limited extent during treatment and which more or less serves as an abutment for the tooth to be moved. Yet, the principle of "actio-reactio" is effective, i.e. the reference tooth will also by displaced more or less insignificantly by the actuating power of the regulatory device.

It had been suggested to dispose an attachment point of the regulatory device which serves as a reference not on one tooth, but on a point which is actually fixed to the jaw during the entire duration of the treatment, e.g. in the mandibular bone, which can be assumed as a real reference point, and, in the meantime, this has partly become general practice.

There, a miniature implant, e.g. a screw, is inserted. Such a miniature implant serving as a reference point is designated as TAD implant, TAD meaning temporary anchorage device.

An example of such a regulatory device working in accordance with this principle is described in the U.S. Pat. No. 6,435,870. This regulatory device serves i.a. for displacing two opposite molars along the mandibular arch in the distal direction, the regulatory device being clamped between a means for inserting the retainer at the tooth to be displaced, the so-called lock, and the point on the miniature implant which is fixed to the jaw. The point fixed to the jaw is e.g. located in the front palate area.

Due to anatomic conditions such distraction devices are only inserted into the upper jaw since, in the lower jaw the space for this is not present due to anatomic conditions, not least due to the necessary space requirements of the tongue.

A difficulty in the case of such regulatory devices still consists in exercising forces on the tooth to be displaced and/or the group of teeth to be displaced in a controlled fashion.

The invention is based on the object of indicating a regulatory device, the construction of which is novel and with which the displacement forces on the tooth or the group of teeth can be adjusted in such a precise fashion that the adequate stimulus necessary for a corresponding tissue response, i.e. an alteration process, is generated with them.

This object is attained according to the invention with the features of claim 1.

In accordance with the invention a substantially rigid and dimensionally stable connection between the tooth and/or the group of teeth to be displaced and at least one attachment point fixed to the jaw for the regulatory device is provided, the position of which basically does not change during the treatment of the patient. The attachment point is e.g. located in the mandibular bone.

An adjusting means with a screw spindle located in the displacement direction of the tooth is provided in the rigid connection, with which the adjustment section and thus the stimulus on the tissue for displacing the tooth can be adjusted in a sensitive way. Preferably, the adjusting means is directly connected with the tooth to be displaced.

Alternatively, a point of support and/or intermediate element may be provided in the rigid connection between the tooth and/or group of teeth to be displaced in the jaw, e.g. in the form of a bracket on a tooth, preferably the first premolar tooth, the length of the connection between the point of support and the tooth and/or group of teeth to be displaced being variable.

Preferably, the rigid connection consists substantially of two parts which are mechanically connected with each other, namely, at least one connecting element connected with the attachment point fixed to the jaw and a driving element containing the adjusting means and leading to the tooth to be displaced, which is as short-pathed as possible.

Further developments are revealed by the sub-claims.

It is possible with an orthodontic regulatory device according to the invention to also displace molars in the lower jaw, i.e. to mesialize or to distalize them without the occurrence of a retrusion or protrusion in the front and canine tooth area as a counter-effect.

Before this newly developed device is to be presented in a more concrete fashion, the biomechanical and histophysiological phenomena on which its development is based, i.e. any reactions or processes, etc., are first of all to be dealt with.

As stated above, the function of an orthodontic regulatory device consists in enabling a tooth movement. The quality of an orthodontic device becomes apparent in the extent that it makes it possible to exert the adequate stimulus on the corresponding tissue of the tooth-holding device and adjacent structures, which is necessary for the tooth movement, in order to generate, on the one hand, tissue reactions being gentle on the tissue and, on the other hand, tissue reactions that are controlled and can be controlled.

In this case, the generated stimulus must correspond to the receptor characteristic of the "target tissue" both in its quality, but also as regards its dosage. Of course, the law of actio and reactio also applies to orthodontics, it being a target here to "invalidate" this law by also including biomechanical reactions into the planning and characteristic of the orthodontic regulatory device.

Here, the introduction of the mentioned TAD technology in the orthodontic therapy represents an important step. Due to the placing of a miniature TAD implant in a bone which is not directly connected to the tooth-holding device it is possible to make a mechanical abutment fixed to the jaw starting from a neutral space and/or area. This abutment serves for anchoring the orthodontic regulatory device.

Unfortunately, it became apparent that the hopes placed in TAD technology had to be relativized on account of "therapy failures" due to the loosening of the miniature TAD implants. Often, the miniature implants did not withstand the mechanical load, for instance due to a too highly dimensioned force or a too high torque.

Due to anatomic conditions the opinion prevails above all in the therapy in the lower jaw that a displacement of the molars in the sagittal, mainly in the distal direction, is hardly possible without the undesired reactive effect on the front and canine tooth area (actio-reactio).

A mainly biomechanical analysis of possible causes for these therapy failures, which was made by the inventor, resulted in the development of a new orthodontic treatment conception which is achieved with the invention.

Here, two central factors are of importance:

On the one hand, it must be possible to dose the stimulus input required for the tooth movement as regards its quality and quantity in such a way that an adequate stimulus can develop in the tissue. This stimulus as an initiator starts reactions in the corresponding tissue, which are to be allocated to a "signal path for the osseous alteration". In order to generate this reaction, provided that the relevant receptor and/or the receptor system can be triggered by the device in accordance with its stimulus threshold between subliminal and supraliminal, a mechanism is required which makes a fine control of the activation and/or displacement path of the tooth possible. In order to fulfill this criterion the use of a screw as a force element is of advantage, actually even necessary. As opposed to elastic force elements such as tension springs or elastic tension elements in which force and degree of force depend on the elongation across a path, the force of an adjusting screw does not depend on the path. Due to the fact that an adjusting screw unfolds its full force/output potential in a controlled fashion from the first degree of its rotation so-to-speak from the first micrometer via its thread propulsion, it makes a precise definable therapeutically mechanical control right from the beginning possible. Non-physiological strains on the tissue can e.g. be avoided by this.

Criteria of an "adequate stimulus" of the mandibular tissue when displacing the tooth are, for instance, type, intensity, direction and duration of the actuating forces. Secondary stimuli, etc. (signal transduction) are generated during the course of the mentioned "signal path"—which, in the last analysis, results in a cascade consisting of stimulus, stimulus response and again stimulus until the new stable and stimulus-free condition is achieved, during the course of which the tooth movement finally also represents a stimulus response.

On the other hand, the miniature implant must be additionally protected against overstresses and defective stresses at the attachment point in the jaw to which the regulatory device is connected in a fashion that it is fixed in the jaw. So far, it has mostly been customary to bring one or several TAD implants as stationary anchoring elements directly in a power relationship to the tooth or group of teeth to be displaced.

Thus, there is a power-stable between the implant and the tooth and/or group of teeth to be displaced. In addition to the difficulty of "force dosing" due to the anatomically caused weakness and/or inadequacy of the abutment in the bone, not least due its spongy structure (and due to the occurrence of disadvantageous torques, etc.) the individual miniature implant often proved to be not enough resistant. Since the connection between tooth and miniature implant is often relatively long and the tooth to be moved is in motion, e.g. caused by resilience, a torque is formed on the head of the miniature implant screw, due to which crestal areas of the implant bearing are above all overstrained.

Within the framework of the development of the regulatory device according to the invention this resulted in the consideration to improve the lack of stability of the TAD implant by means of measures supplementing the anchoring potential.

A solution of this problem is the direct and short-distance rigid-mechanical coupling of the TAD implant to the tooth of the device (tooth 4) which is also to be remain stationary.

This Has Several Advantages:

At first, it is obvious that the persistence power of the tooth is added to the anchorage force of the TAD implant. However, further facts will result in the case of a more differentiated reflection.

Due to the rigid connection between the screw(s) of the miniature implant, which is (are) required for achieving the torsional rigidity, the connecting element to the tooth and the tooth with its root, a new, rigid, spatial structure is formed. The "anchoring elements" in this structure are spatially separated from each other. Their axes, substantially the screw thread and the tooth root, are largely vertical to each other, the tooth being directed in the vertical direction and the implant being directed obliquely and transverse-horizontally. Due to its rigidity towards the outside this structure must mechanically be considered as one body. A greater total stability via-a-vis forces which could be caused by occurring torques results from this.

It must be noted that the axes of the individual elements are so-to-speak vertically to each other in the "inner relationship" of the regulatory device according to the invention, due to which the quality of the load in axial or translatory direction never is the same for all anchoring elements. All components of the structure form a stable three-dimensional (3D) structure even during the displacement of the tooth and/or the group of teeth.

Since due to their fixing with respect to each other—if one takes the forces customary in orthodontics for granted—hardly any tilting movements take place, only a translatory movement of the tooth and/or the group of teeth would be possible, if a force acts in the sagittal direction. This means that a force acting on the entire system is uniformly distributed across the areas of the anchoring elements which are subjected to the pressure, provided that it remains in the physiological range. Thus, all this constitutes a self-stabilizing system.

The anchoring elements, miniature TAD implant and tooth are to remain stationary per definitionem. In order to be able to comply with this criterion the stimulus acting on the anchoring unit must not induce any effect for an alteration process, if possible, the stimulus must remain subliminal there. There is an additional aspect in that the adequate biomechanical stimuli act very differently as a trigger of signal path reactions for the tooth root, the tooth-holding device and the bone surrounding the screw thread of the regulatory device. Due to this, a control controlling itself reciprocally is obtained (reciprocal feedback).

This Means In Detail:

The tooth and/or the tooth root and the miniature TAD implant generate completely different tissue reactions in the case of a pressure load on the bone. This is attributable to the fact that a tooth root is connected with the alveolar bone by means of its tooth-holding means, i.e. a biologically highly reactive system, whereas there is no material connection between the steel of the miniature implant, i.e. preferably titanium steel (Ti-6Al 4V) and the bone tissue (osseous integration). The tooth suspended in the Sharpey's fibers of the periodontium (expressed in a simplified fashion) possesses as resistance elasticity due to its resilience, which reduces the load of the miniature TAD implant in the bone support via the short rigid connection. On the other hand, the miniature TAD implant is largely supported without any resilience in the lacuna system of the bone. A mechanical anchoring potential is mainly caused by the thread profile of the implant screw. As regards the amount of pressure, a mature bone can be loaded by pressure to a substantially greater extent due to its high share of minerals and the very reduced metabolism activity of the osteocytes, since, here, no cell division takes place and there is no direct connection to the blood system.

Thus, it is prevented, due to a minor mobility and/or resilience of the miniature TAD implant on the anchorage side, that the alteration stimulus becomes supraliminal in the area of the periodontal tissue of the premolar tooth.

The present invention represents the techno-mechanical solution of said complex therapy problems.

It is a synergistic system, two different mechanics with different properties being coupled to each other in mechanical and functional respect.

Thus, the regulatory device consists of two parts in mechanical respect. Here, one part represents the drive for moving the molar tooth and/or group of teeth, whereas the other part takes over the function of the anchoring. Both parts are mechanically connected to each other via an intermediate element, a point of support, for instance, preferably a bracket, which should be attached to the first premolar tooth, i.e. tooth 4.

The synergistic effect is only created by this firm rigid-mechanical connection of both parts to the one premolar tooth in the area of the point of support and/or bracket.

Preferably, the driving part consists of a spindle drive in the shape of a threaded rod which comprises on its mesial end, i.e. that end pointing to the oral aperture, a means for placing a hexagon screw driver, for instance with a corresponding hexagon cog. At is opposite distal end, it ends, tapering in one step, in a pin, the diameter of which precisely matches the inner diameter of a bumper tube and which is about 6 millimeters longer than the same. A bumper tube which facultatively forms part of the equipment of a molar attachment serves for receiving the aforementioned pin changing its actual function. The step formed at the tapering represents the distal abutment for the function as a distalization means.

A nut is provided on the driving thread, to which a square wire is stably connected in the longitudinal direction. This square wire which is dimensioned in such a fashion that it fits into the slit of the bracket of the premolar tooth flushes with the nut in the distal direction and projects at least to such an extent beyond the same in the mesial direction that it can be inserted into the bracket slot. It is necessary to make this connection in such a way that it cannot be displaced because pressure is built up between the premolar tooth (tooth 4) as the front abutment and the molars, for instance tooth 6, as the rear abutment by rotating the threaded rod, said pressure representing the stimulus for the tooth movement of the molars.

If the device is to serve for mesializing a molar and also as a safety means against an undesired slipping out of the bumper tube, a thread is provided in the pin at a distance from the step upon the transition of the tapering of the thread, which corresponds to the length of the bumper tube plus approx. 0.2 millimeters (mm), said thread being counter-directional to the driving thread and having a length of approx. 3 mm. This thread accommodates a fitting nut which acts as a counter-nut and/or distal rear abutment in the case of a closing of the gap between two teeth, upon tensile load. The end piece of the pin which distally adjoins the thread is smooth across a length of approx. 2 mm and tapered for the easier insertion of the screw.

The front abutment and its effect are obtained by stops on the square wire in the bracket of the premolar tooth, which prevent the slipping through of the square wire in the bracket slit.

In the case of the opening of a gap with a pressure development between the premolar tooth and the molars these stops rest against the distal surface of the bracket on tooth 4.

The stop must be placed before the mesial limitation of the bracket in the case of the closing of a gap with a generation of tension between the premolar tooth and the molars.

Bayonet bends, crimp stops or sharp bent over parts of the square wire may e.g. be used as stops.

The abutment effect is mechanically obtained in the premolar tooth, for instance by the fact that a bayonet bend or a crimp stop prevents the slipping of the edged wire in the bracket slit.

The abutment effect on the molar side for the distalization is generated due to the fact that the thread diameter of the threaded rod is larger than the diameter of the bolt-like and/or pin-like projection and/or larger than the inner diameter of the bumper tube.

The step which is consequently formed upon the transition of thread to a bolt and/or pin and which abuts against the mesial opening of the bumper tube represents the stop for the distal, i.e. rear abutment.

A corresponding analogous thread as mentioned above is provided on the part of the bolt element which projects from the bumper tube for a mesialization of the molars.

The anchoring element of the device is also attached to the point of support, the premolar tooth, customarily the 4th tooth. Its object is to create a connection between the premolar tooth and a miniature TAD implant and/or its connecting wire. For this purpose, an edged wire is welded between the blades of a double-blade bracket which extends at a distance of approx. 1 mm from the gingiva, i.e. the gum, beyond the bracket base approx. 10 mm in the direction of the duplicature.

The device for receiving the connecting wire to the screw head of the TAD implant is located on the surface not facing the gum on the free end of the square wire in the shape of approx. two welded-on crimp stops.

After the TAD connecting wire has been adjusted in such a fashion that it rests between the open mouth of the crimp stop and the receiving element on the TAD screw head in a stress-free fashion, they are pressed together and wetted and/or coated with an adhesive gel for the additional fixing.

It is also possible to directly connect the connecting wire originating at the bracket with the receiving head of the TAD if it is of a corresponding length. This is functionally equivalent, however, more complicated requirements must be met by the technical putting into practice.

Provided that the connection between TAD and connecting wire is also firm, there is now a rigid connection between the root of a tooth, the crown of a tooth, the bracket, the receiving means and the miniature TAD implant.

Thus, the optimum anchoring and movement situation for the lower jaw is achieved in the form of a mixed or also indirect anchoring and in connection with a screw as a precise force element.

A self-stabilizing system is attained with the invention, to which the stimulus reception of the jaw tissue responds during adjustment, none of the components of the entire device being overstressed.

Figure 2:
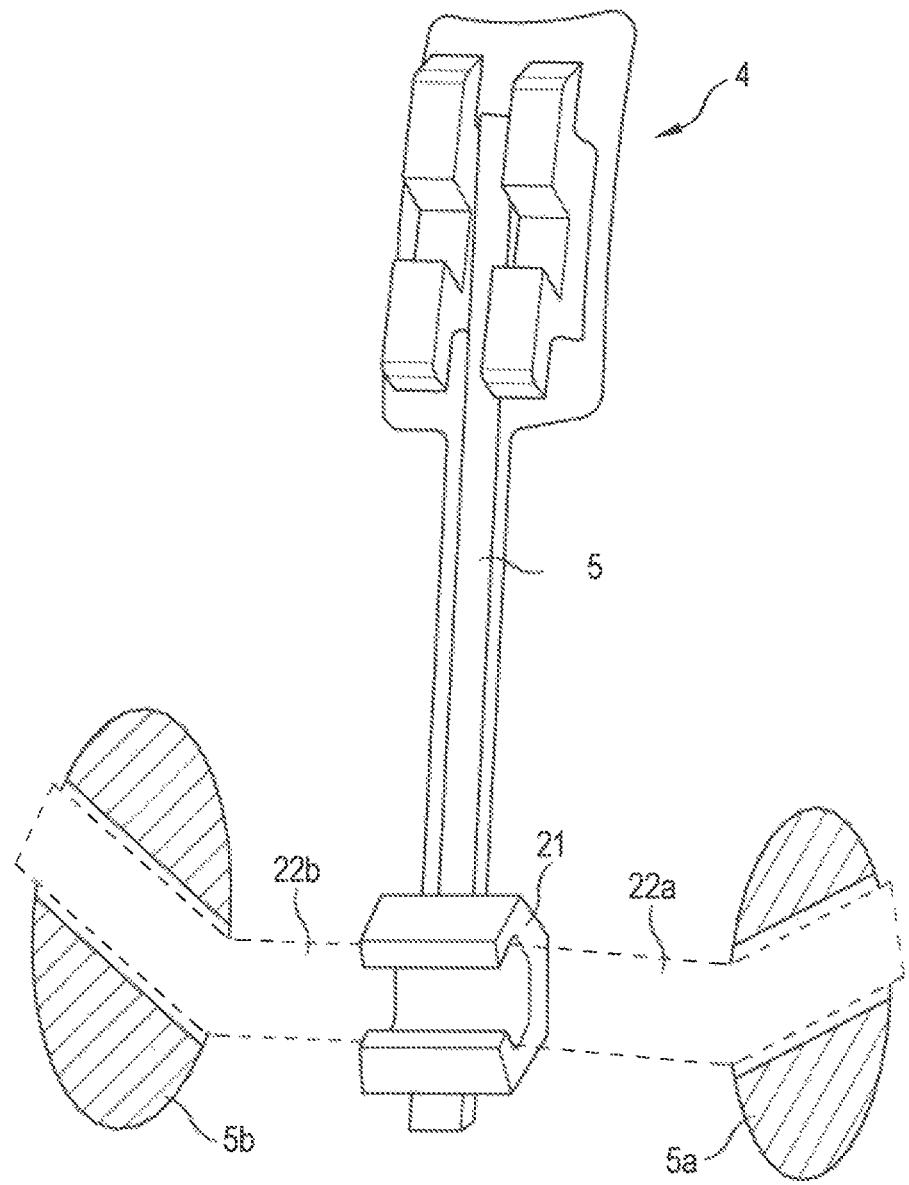
Figure 3:
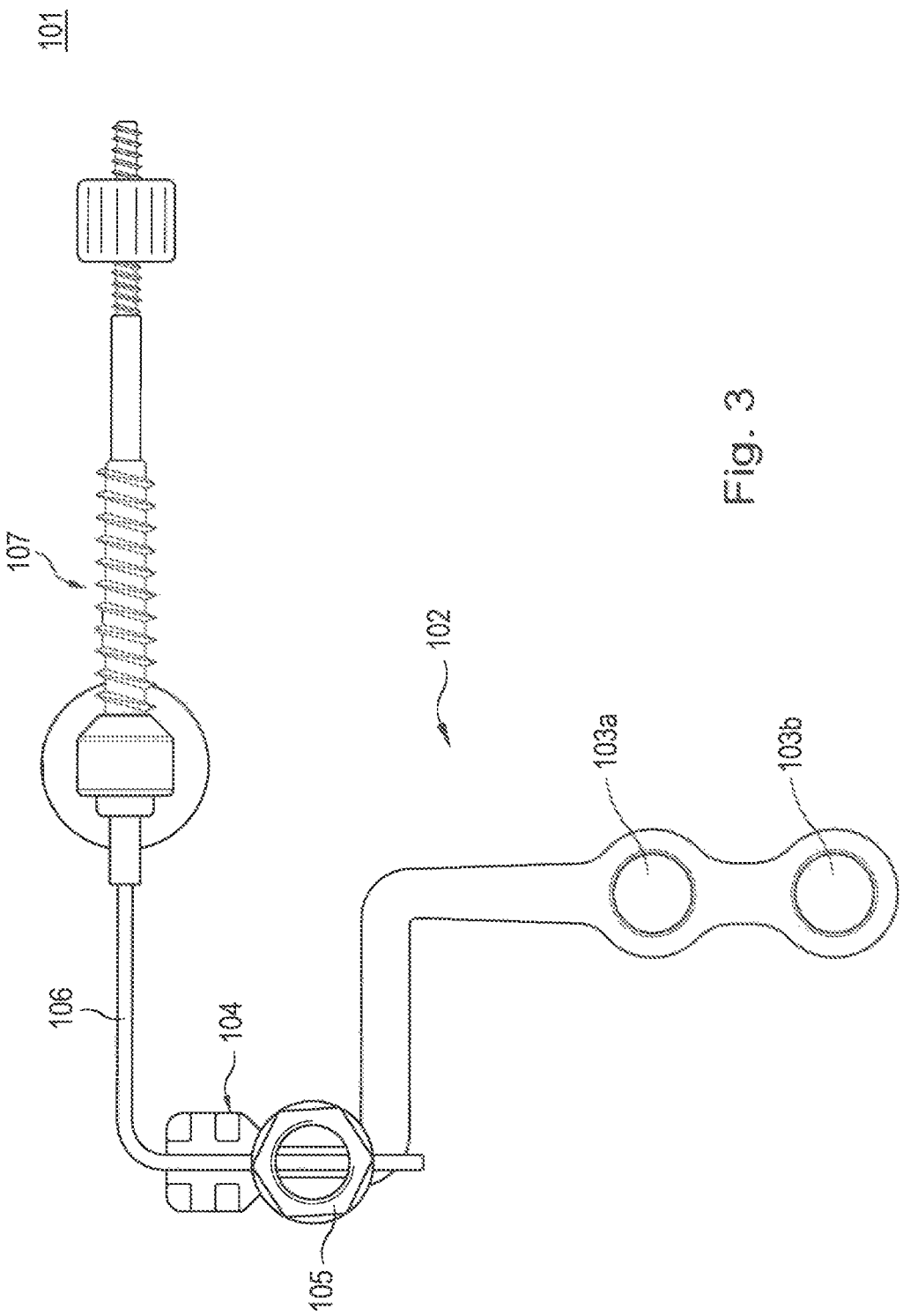

The invention is explained in greater detail in two examples of embodiment by means of the FIGS., wherein:

FIG. 1 schematically shows an orthodontic regulatory device according to the invention for displacing a tooth, in particular a molar, which comprises an anchoring part and a driving part, which each start from a support point, and FIG. 2 shows a variant of the anchoring part, and FIG. 3 shows a variant of the regulatory device.

A first embodiment of a regulatory device 1 for displacing a tooth of a patient and/or a group of teeth directly adjoining this tooth consists of two parts mechanically connected with each other, namely an anchoring part 2 and a driving part 3.

Both parts start from a point of support which is located in the jaw, e.g. a bracket 4, which is attached on the tooth No. 4. The bracket serves as an intermediate element between the parts 2 and 3 which are connected with each other bridging a short distance. Due to the spatial conditions the connection should be as short as possible. Other points of support are possible as described below with respect to FIG. 3.

The anchoring part 2 comprises a stable wire 5 which starts from the bracket 4 and leads to an attachment point 14 which is firmly connected to the jaw, for instance a TAD element such as a miniature implant screw held in the mandibular alveolar process of the bone. Several screws may also be used to hold the anchoring part in a torsion-proof fashion.

The attachment point does not change its position during the treatment. The wire 5 comprises some clamping elements 6, in this case two, so-called crimp stops, with which the connecting wire 5 to the miniature implant is clamped.

Likewise, stops must be attached to both ends of the intermediate bracket 4 in order to limit a mesial and/or distal movement.

A variant of the connection between bracket and the screw head of the TAD element consists in directly connecting only one square wire which is e.g. 20 mm long and e.g. welded to the bracket with the TAD screw head. Since the connection between the bracket and the screw head must largely be rigid and stress-free, this requires more skill when bending the wire and a correspondingly advantageous shape of the screw head.

Moreover, the device can be configured in such a way that it is compatible with all customary mechanics within the purview of the invention. More detailed indications on the design are left to the discretion of a person skilled in the art.

A further stable short square wire 7 largely leads from the bracket 4 at a right angle (here represented in an exaggerated long form) to the driving unit 3, which is held in a receiving element 8 of an adjusting means 9. A threaded nut 10 of the adjusting means 9 of the driving unit 3 is connected with the receiving element 8. A threaded rod and/or a threaded spindle 11 moves in it. The threaded rod is provided with, for instance, a hexagon cog at its proximal end facing the oral aperture of the patient, in which a corresponding hexagon socket spanner for adjusting the threaded rod can be inserted in its longitudinal direction.

The threaded rod 11 possesses a smooth bolt- or pin-shaped projection 12 which engages in the lumen of a bumper tube 13 with accurate fit. The bumper tube is part of a known attachment on the tooth to be displaced.

The lead of the thread of the threaded rod 11 is selected in such a way that the adjusting means 9 may also be adjusted for very short changes in length.

The dimensions and in particular the course of the stable wires Sand 7 are indicated only by way of example. It is possible to bend the stable wire S slightly in the form of a bayonet, for instance, when it leaves the bracket 4 in order to prevent an irritation of the alveolar mucous membrane. Of course, the length of the stable holding wire 7 must likewise be adapted to the geometry of the jaw.

A variant for the anchoring part 2 is represented in FIG. 2. The stable wire 5 starts from the intermediate bracket 4 and leads to a distributor 21, from which two stable wires 22a and 22b start in this case in opposite directions, which end in each case at an attachment point 5a and/or 5b fixed to the jaw, for instance a TAD element. The attachment points are preferably located on opposite (mesial, distal) sides of the root of the anchoring tooth 4 which supports the intermediate element bracket.

The principle of a rigid connection or coupling which is as short as possible between one to two or more miniature implants and an adjacent tooth can be extended to a kind of system, if several teeth which, as described above, are provided with a bracket, are connected with each other along the mandibular arch with a strong attachment wire via their attachment points. Due to this, an anchoring system is formed which, if required, comprises the entire mandibular arch.

As a by-product of the mechanical system presented here it must be noted that, above all due to their high total rigidity in the lateral, vertical and sagittal plane and the "restricted" guiding of the tooth movement obtained by this, this construction in capable of ensuring a largely "physical" movement of the molar, substantially without any influence on the jaw structure. The possibility of carrying out physical tooth movements with it is an important judgement criterion for an orthodontic device. This performance feature is achieved without the necessity of the use of a complex multi-band device. Consequently, the device can also be used prior to the conclusion of the second dentition, the result being that important therapy measures such as, for instance, the closing of aplasia gaps can be initiated earlier.

A variant of a regulatory device 101 is represented in FIG. 3.

The device comprises an attachment arm 102 which, for the torsion-proof attachment of the device in the jaw bone within the gingiva, comprises two linearly superimposed screw holes, an "upper one" 103a and a "lower one" 103b, which receive corresponding screws. Other embodiments are possible.

Outside the gingiva the attachment arm 102 is bent twice by about 90 degrees, a retainer 105 for a longitudinally slotted screw such as a Gurin screw is provided in a short end piece 104. A wire 106 can be inserted into and fixed in this retainer with an accurate fit in the direction the arm 102 extends, said retainer comprising a groove corresponding to the dimension of the connecting arch 104 so that the same is defined in its position, said wire leading to an adjusting means 107 after a bend of about 90 degrees for displacing the tooth as it was described and shown above. The design of the attachment arm with respect to its bends must be adapted to the anatomic conditions.

The screw spindle of the adjusting device extends approximately along the mandibular arch in the direction of displacement of the tooth and/or group of teeth to be corrected.

In this embodiment no "separate point of support" is directly provided between the attachment fixed in the jaw and the adjusting means. However, the screw in the upper screw hole 103a for the torsion-proof attachment of the arm 102 functionally corresponds to the point of support of the bracket. As opposed to the point of screw screwing in the TAD, which is located in the area of the gingiva propria ("attached gingiva"), the torsion-proof arm 102 or a corresponding anchoring plate is directly screwed into the jaw bone in the area of the movable oral mucosa below the area of the gingiva propria. There, the quality of the bone, above all the width of the cortical substance, makes a higher loadability of the fixing screws possible.

The advantage of the mechanically stable anchoring requires a minor surgical intervention. Here, the surface of the bone must be exposed, the mucous membrane must be opened at the place intended for the insertion of the fixing screws and sutured after the insertion of the art 102 or a connecting plate.

The device can be used in both jaws. Here, modifications are necessary taking into account the respective jaw-specific anatomic conditions above all as regards the correct connection of the device with the remaining orthodontic 'brace' and the anchoring means. The device is to be incorporated into the lower jaw, preferably buccally/vestibularly between at least one implant screw and/or a basal arch and a palatal lock with a round tube attached thereto (analogously to the bumper tube) which is preferably located on the 1st molar.

The device is identical for both jaws as regards its structure, design and functional features.

The invention claimed is:

1. An orthodontic device for displacing at least one tooth of a patient and/or a group of teeth directly adjoining the at least one tooth along the mandibular arch; in particular in the lower jaw in the area of the molars, the device comprising:
   an anchoring part and a driving part, mechanically connected with each other by an intermediate element, the intermediate element being adapted to be attached to a premolar tooth;
   a first stable connection leading from the intermediate element to the anchoring part and ending at an anchoring element adapted to be firmly fixed in the jaw;
   a second stable connection leading from the intermediate element to the driving part, the second stable connection ending at an attachment adapted to be fixed on at least one tooth to be displaced;
   wherein the second stable connection includes an adjusting means with a screw spindle drive for changing a length of the second stable connection in a displacement direction of the at least one tooth, thereby displacing the at least one tooth by generating an alteration stimulus on the tissue surrounding the root of the at least one tooth.

2. The device according to claim 1, wherein the first stable connection comprises a stable wire leading from the intermediate element to the anchoring element, the anchoring element being a miniature implant adapted to be screwed in the jaw, immobile, and torsion-proof.

3. The device according to claim 2, wherein the miniature implant is a temporary anchoring device.

4. The device according to claim 1, wherein the intermediate element is a bracket adapted to be attached to the premolar tooth.

5. The device according to claim 4, wherein the bracket is connected with two stable wires leading to the anchoring element of the first stable connection and to the screw spindle drive of the second stable connection, respectively, the stable wires being vertically upon each other.

6. The device according to claim 1, wherein the screw spindle drive comprises a threaded rod moving in a threaded nut and aligned in a displacement direction of at least one tooth, the threaded rod comprises a pin-shaped projection engaging in a lumen of the attachment adapted to be connected with the at least one tooth.

7. The device according to claim 1, wherein the attachment is a bumper tube.

8. The device according to claim 1, wherein the first stable connection starting at the intermediate element comprises a stable wire leading to a distributor from which two arms lead in opposite directions to individual anchoring elements.

9. The device according to claim 1, wherein the device installed in the mandible is a rigid, dimensionally stable connection.

10. The device according to claim 9, wherein the device leads to a distributor from which arms structured to lead to points fixed to the lower jaw in the opposite direction.

11. The device according to claim 1, wherein the anchoring part and the driving part form a rigid, dimensionally stable connection between the at least one tooth to be displaced and the attachment point fixed to the jaw, and substantially not changing during the treatment of the patient, and wherein the screw spindle is structured to change the length of the rigid connection between the attachment point and the at least one tooth to be displaced and, thus, to generate an alteration stimulus on the tissue surrounding the at least one tooth to be displaced.

* * * * *